(12) United States Patent
Shige

(10) Patent No.: US 7,594,758 B2
(45) Date of Patent: Sep. 29, 2009

(54) ROLLING BEARING UNIT

(75) Inventor: Yoshifumi Shige, Osaka (JP)

(73) Assignee: JTEKT Corporation, Osaka (JP)

( * ) Notice: Subject to any disclaimer, the term of this patent is extended or adjusted under 35 U.S.C. 154(b) by 703 days.

(21) Appl. No.: 10/548,913

(22) PCT Filed: Mar. 12, 2004

(86) PCT No.: PCT/JP2004/003312

§ 371 (c)(1),
(2), (4) Date: Sep. 13, 2005

(87) PCT Pub. No.: WO2004/081401

PCT Pub. Date: Sep. 23, 2004

(65) Prior Publication Data
US 2006/0285786 A1 Dec. 21, 2006

(30) Foreign Application Priority Data
Mar. 13, 2003 (JP) ............................ P2003-067704

(51) Int. Cl.
F16C 33/78 (2006.01)
F16C 35/04 (2006.01)

(52) U.S. Cl. .................. 384/489; 384/448; 384/544

(58) Field of Classification Search ......... 384/448–450, 384/477, 486, 488–489, 516, 544, 388; 310/108.1, 310/108.3
See application file for complete search history.

(56) References Cited

U.S. PATENT DOCUMENTS

| 5,148,104 | A  | * | 9/1992  | Ishikawa      | 384/448  |
|-----------|----|---|---------|---------------|----------|
| 5,195,807 | A  | * | 3/1993  | Lederman      | 301/108.1|
| 5,296,805 | A  | * | 3/1994  | Clark et al.  | 384/448  |
| 5,380,103 | A  | * | 1/1995  | Lederman      | 384/489  |
| 5,544,962 | A  | * | 8/1996  | Hofmann et al.| 384/448  |
| 5,803,617 | A  | * | 9/1998  | Ohnuki et al. | 384/486  |
| 5,816,711 | A  | * | 10/1998 | Gingrich      | 384/488  |
| 6,217,220 | B1 | * | 4/2001  | Ohkuma et al. | 384/489  |
| 6,218,827 | B1 | * | 4/2001  | Ohmi et al.   | 324/174  |
| 7,104,695 | B2 | * | 9/2006  | Shevket       | 384/450  |
| 2004/0096133 | A1 | * | 5/2004 | Toda et al.   | 384/589  |

FOREIGN PATENT DOCUMENTS

JP  10-19912  1/1998
JP  2003-13982 1/2003

* cited by examiner

Primary Examiner—Marcus Charles
(74) Attorney, Agent, or Firm—Jordan and Hamburg LLP

(57) ABSTRACT

A rolling bearing unit includes a resin-made cover attached at the opening of the vehicle inward side edge section of an outer ring. The cover includes a cylindrical portion which is fitted into the inner peripheral surface of the opening of the vehicle inward side edge section of the outer ring. A metal ring body is provided at the inner peripheral surface of the cylindrical portion.

13 Claims, 4 Drawing Sheets

ROLLING BEARING UNIT

BACKGROUND OF THE INVENTION

The present invention relates to a rolling bearing unit for rotatably supporting the wheels of an automobile or the like on a suspension system. More specifically, the invention relates to a rolling bearing unit equipped with a cover at an opening on an outer ring edge.

As disclosed in Japanese Laid-Open Patent Application Publication No. 10-19912, the rolling bearing unit is structured so that a cover made of resin is attached to the outer ring edge section opening to make it difficult for muddy water or the like to enter the bearing via the opening. The cover comprises a circular plate portion for covering the outer ring edge section opening and a cylindrical portion which is fitted into the inner peripheral surface of the opening with clearance. In such a cover, when the cylindrical portion is fitted into the inner peripheral surface of the outer ring edge section opening, the cylindrical portion is deformed into a narrow end and a gap occurs between the inner peripheral surface of the opening and the outer peripheral surface of the cylindrical portion, so the function of preventing muddy water from entering the bearing may be degraded.

BRIEF SUMMARY OF THE INVENTION

The present invention is a rolling bearing unit comprising a cover at the outer ring edge section opening, wherein the cover comprises a circular plate portion for covering the outer ring edge section opening and a resin-made cylindrical portion which is fitted into the inner peripheral surface of the outer ring edge opening, and a metal ring body is provided at the inner peripheral surface of the cylindrical portion.

According to the present invention, when the resin-made cylindrical portion of the cover is fitted into the inner peripheral surface of the outer ring edge section opening, deformation force acting radially inward on the cylindrical portion is stopped by the ring body, end-narrowing deformation of the cylindrical portion is suppressed, and the cylindrical portion closely contacts the inner peripheral surface of the outer ring edge section opening. As a result, attachment strength of the cover to the outer ring edge section opening is increased and it is possible to effectively prevent moisture from entering the bearing.

As a preferred embodiment of the present invention, if the axial-direction length of the ring body is made shorter than the inner fitting length with respect to the inner peripheral surface of the outer ring edge opening on the cover cylindrical portion, the ring body strength for stopping deformation force acting radially inward on the cylindrical portion increases, and end-narrowing deformation of the cylindrical portion is suppressed more effectively.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
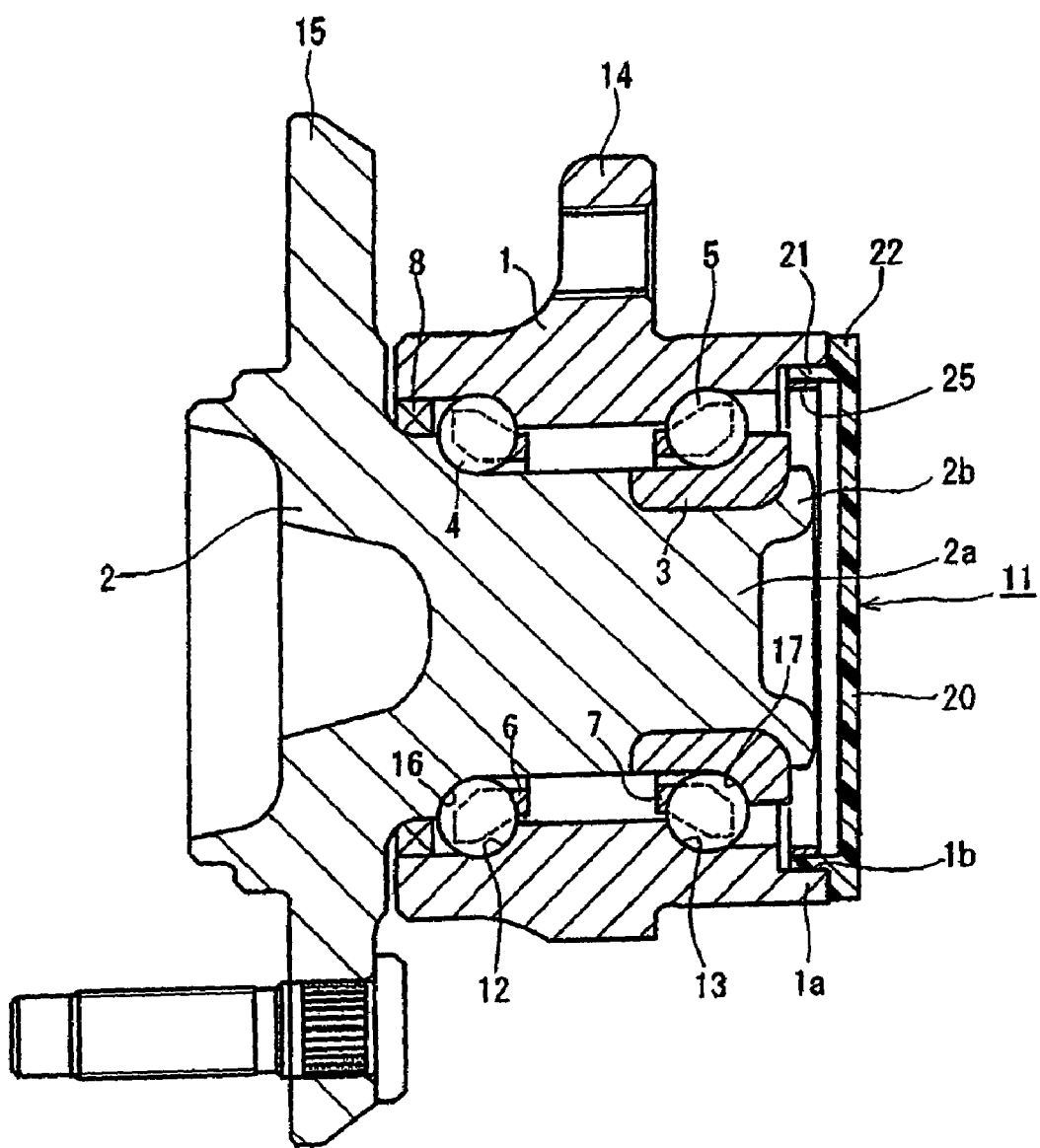
FIG. 1 is a cross-sectional view of a rolling bearing unit according to a preferred embodiment of the present invention.

Hereinafter, referring to the drawings, description will be made of a rolling bearing unit for vehicles according to a preferred embodiment of the present invention.

FIG. 1 is a cross-sectional view of the same rolling bearing unit. In FIG. 1 the left side represents the side toward the vehicle outside and the right side represents the side toward the vehicle inside. An outer ring 1 is made of metal such as high-carbon steel meeting JIS S55C or bearing steel meeting JIS SUJ-2, and is a fixed ring fixed to the body of a vehicle such as an automobile.

The outer ring 1 comprises a flange portion 14 for vehicle body fixing for supporting the outer ring 1 on a suspension system (not shown) at the outer peripheral surface roughly in the center thereof in the axial direction. The ring 1 also comprises outer ring raceways 12 and 13 on its inner peripheral surface on the vehicle outward side and the vehicle inward side respectively.

A hub spindle 2 constitutes a ring that rotates with respect to the outer ring 1. The hub spindle 2 comprises a flange portion 15 for wheel fixing at the outer peripheral surface on the vehicle outward side. The hub spindle 2 also comprises an inner ring raceway 16 opposite the outer ring raceway 12 at an outer peripheral surface more inward than the flange portion 15.

An inner ring 3 is outwardly fitted to the outer peripheral surface of a small-diameter cylindrical portion 2a on the side toward the vehicle inward side of the hub spindle 2 and is capable of rotating unitarily with the hub spindle 2. The inner ring 3 thus constitutes a ring that rotates together with the hub spindle 2 with respect to the outer ring 1.

The inner ring 3 comprises an inner ring raceway 17 opposite the outer ring raceway 13 on the outer peripheral surface. The inner ring 3 is prevented from slipping out by a bent edge section 2b on the side of the hub spindle 2 toward the vehicle inward side, and is pre-pressured thereby.

A plurality of balls 4 and 5 are rotatably held between the outer ring raceways 12 and 13 and the inner ring raceways 16 and 17 by cages 6 and 7 respectively. A seal 8 is interposed between the inner peripheral surface of the vehicle outward edge section of the outer ring 1 and the outer peripheral surface of the hub spindle 2.

In order to protect the inside of the bearing from external muddy water or the like in conjunction with the seal 8, the rolling bearing unit comprises a resin-made cover 11. The cover 11 is cylindrical and has a bottom, at an opening 1b of an edge section 1a on the side of the outer ring 1 toward the vehicle inward side.

The cover 11 comprises a circular plate portion 20 which covers the opening 1b of the vehicle inward side edge section 1a of the outer ring 1. A cylindrical portion 21 of the cover 11 is inwardly press-fitted to the inner peripheral surface of the opening 1b. A flange portion 22 of the cover is provided at the periphery of the circular plate portion 20 and restricts the inner fitting depth of the cylindrical portion 21 with respect to the inner peripheral surface of the opening 1b of the outer ring 1.

Preferably, most of the entire cover 11 is formed of a resin. A metal ring body 25 is integrally provided at the inner peripheral surface of the cylindrical portion 21. Preferably, the material of the ring body 25 is a cold rolled steel sheet meeting such standards as JIS SPCC. Furthermore, it is not necessary to form the entire cover 11 of resin. For example, only the cylindrical portion 21 may be formed of resin.

Figure 2:
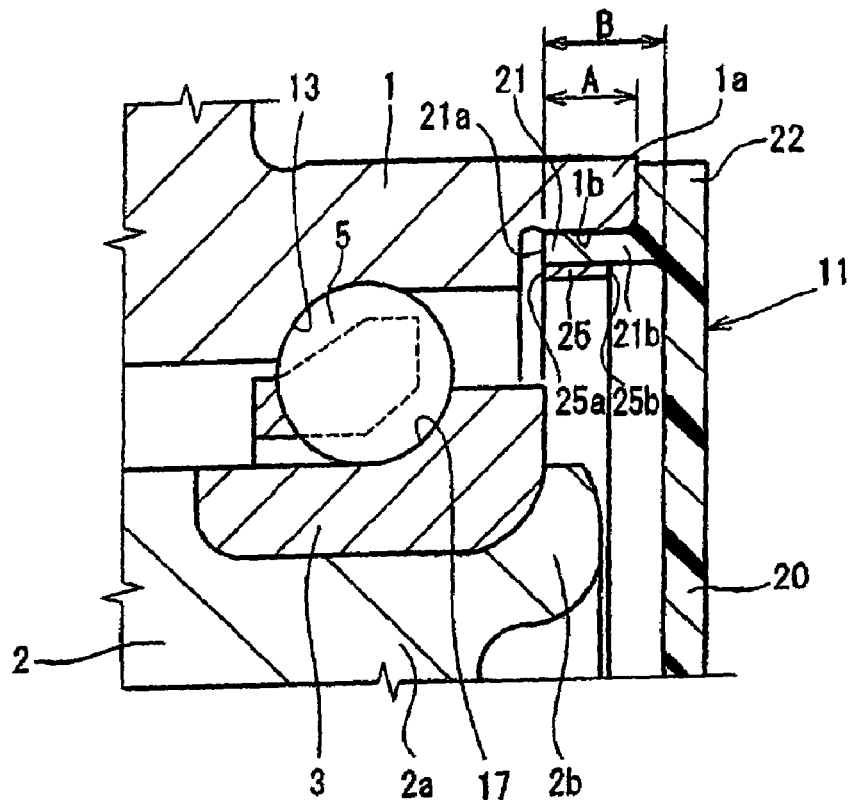
FIG. 2 is a view showing a principal portion of FIG. 1.

Referring to FIG. 2, the structure of the cover 11 shall be described in more detail. Illustrated is the positional relationship in the axial direction between the vehicle inward side edge 1a of the outer ring 1 and the vehicle inner side edge 2b of the hub spindle 2. As a result of this relationship, the axial-direction length B of the inner peripheral surface of the cylindrical portion 21 of the cover 11 is made longer than the axial-direction length A of the outer peripheral surface thereof.

Therefore, when the cylindrical portion 21 of the cover 11 is press fitted into the inner peripheral surface of the opening 1b of the edge section 1a of the outer ring 1 on the vehicle inward side, the tip side of the cylindrical portion 21 in the press fitting direction contracts and is easily deformed into a cone shape. This is because the cylindrical portion 21 is made of resin and the outer ring 1 is metal.

In order to prevent such deformation, vehicle outward side end face 25a of the ring body 25 is positioned so as to be in the same plane radially with the vehicle outward side end face 21a of the cylindrical portion 21. Furthermore, the end face 25b on the vehicle inward side is positioned more to the vehicle outside than the vehicle inward side root portion 21b of the outer peripheral surface of the cylindrical portion 21.

When the cylindrical portion 21 of the cover 11 is fitted into the outer ring 1, the ring body 25 stops force acting radially inward on the cylindrical portion 21 and prevents the cylindrical portion 21 from being deformed into a cone shape. In particular, the vehicle inward side edge section 25b on the ring body 25 is positioned more to the vehicle outward side than the vehicle inward side root portion 21b of the cylindrical portion 21. As a result, the deformation of the tip side of the cylindrical portion 21 of the cover 11 into a cone shape is more reliably prevented when the cylindrical portion 21 of the cover 11 is fitted into the outer ring 1, and this is preferred.

Accordingly, as the outer peripheral surface of the cylindrical portion 21 of the cover 11 makes close contact with the inner peripheral surface of the opening 1b of the vehicle inward side edge section 1a of the outer ring 1, the attachment strength of the cover 11 to the outer ring 1 is increased. It is thus difficult for moisture to enter inside the bearing, thereby improving hermetically sealing of the bearing interior.

If the ring body 25 is not provided, when the temperature of the rolling bearing unit rises a gap may occur between the opening 1b of the outer ring 1 and the cylindrical portion 21 of the cover 11. This is because of the difference in thermal expansion between the outer ring 1 and the cover 11, i.e., the coefficient of linear expansion of the outer ring 1 is greater than the coefficient of linear expansion of the cover 11.

In this embodiment, the ring body 25 thermally expands in a manner similar to the outer ring, i.e., the coefficient of linear expansion of the outer ring 1 is equal to the coefficient of linear expansion of the cylindrical portion 21. As illustrated, the ring body 25 is provided at the inner peripheral surface of the cylindrical portion 21. Accordingly, the diameter of the cylindrical portion 21 expands by the thermal expansion of the ring body 25 and the outer peripheral surface of the cylindrical portion 21 makes close contact with the inner peripheral surface of the outer ring 1, thereby preventing occurrence of the gap.

The material of the cover 11 is preferably a resin which has a coefficient of linear expansion approximately that of the material of the outer ring 1. Examples are polyamide (PA), polyphenylene sulfide (PPS), and polybutylene terephthalate (PBT). If a resin whose coefficient of linear expansion is approximately that of the material of the outer ring 1 is selected as the cover 11 material, the following occurs. As the temperature rises, the cover 11 also expands to the same extent as the outer ring 1, and it is possible to ensure such a fitting force that the cover 11 cannot not be pulled out of the outer ring 1. When the temperature drops, the cover 11 also shrinks to the same extent as the shrinkage of the outer ring 1, thereby preventing cracking of the cover 11.

Figure 3:
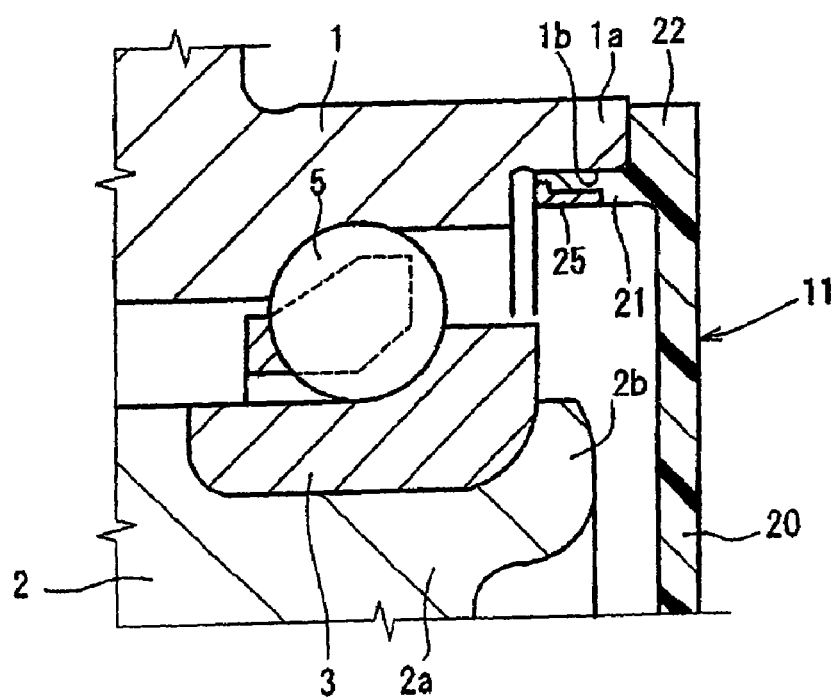
FIG. 3 is a cross-sectional view of a principal portion of a rolling bearing unit according to another configuration of the present invention.

As shown in FIG. 3, it is also possible to have a structure that increases the rigidity of the cylindrical portion 21 by insert-forming the ring body 25 at the cylindrical portion 21 of the cover 11 and by bending the tip side of the ring body 25 radially outward.

Figure 4:
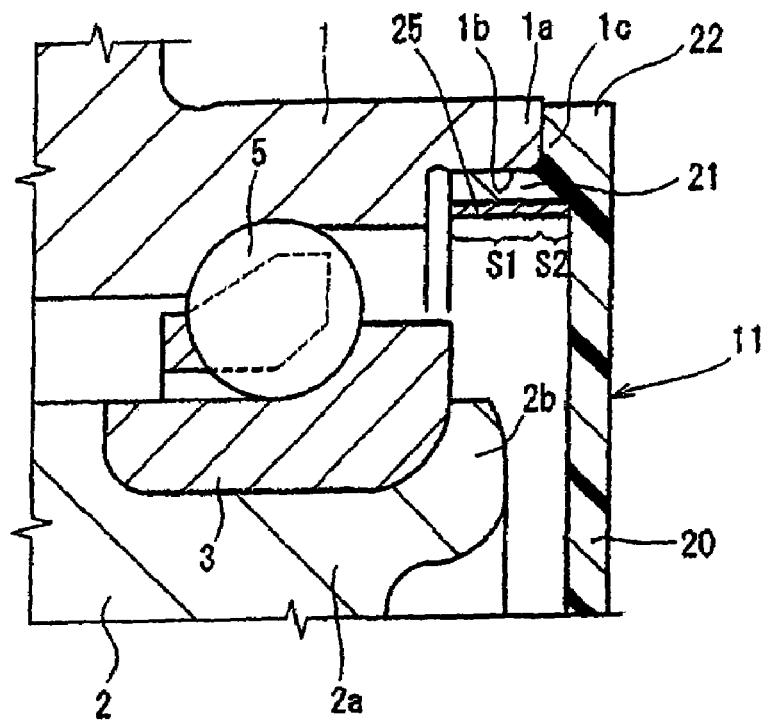
FIG. 4 is a cross-sectional view of a principal portion of a rolling bearing unit according to still another configuration of the present invention.

In an alternative embodiment, as shown in FIG. 4, the ring body 25 may also be insert-formed at the cylindrical portion 21 so as to cross the whole inner peripheral surface of the cylindrical portion 21 of the cover 11. More specifically, the resin cover 11 attached to the opening 1b of the vehicle inward side edge section 1a of the outer ring 1 comprises the cylindrical portion 21. The cylindrical portion 21 is fitted into the inner peripheral surface of the opening 1b of the vehicle inward side edge section 1a of the outer ring 1. The cover 11 also includes the flange portion 22 which contacts an end face 1c of the vehicle inner side edge section 1a of the outer ring 1. The metal ring body 25 is provided at the inner peripheral surface of the cylindrical portion 21. The ring body 25 is extended from an inner peripheral surface area S1 of the cylindrical portion 21 to an inner peripheral surface area S2 of the flange portion 22.

According to the configuration described above, the cover 11 is attached to the outer ring 1 so that the flange portion 22 contacts the end face 1c of the vehicle inward side edge section 1a of the outer ring 1 from the axial direction. In this case, the cylindrical portion 21 of the cover 11 is slightly bent due to its elasticity while being inserted. However, the ring body 25 is fixed to the area from the inner peripheral surface area S1 of the cylindrical portion 21 of the cover 11 to the inner peripheral surface area S2 of the flange portion 22. Accordingly, some of the elastic bending portion of the cylindrical portion 21 is supported by the rigidity of the ring body 25.

When the wheel rotates due to vehicle use, the temperature of the outer ring 1 rises and the heat is transmitted to the cylindrical portion 21. When the vehicle is stopped, the temperature of the outer ring 1 falls and this temperature change is transmitted to the cover 11. Here, if the cylindrical portion 21 is formed only of resin, there will be difficulties in adapting to temperature changes. This is because of the resin coefficient of linear expansion, so there is the danger that the cover 11 may fall off the outer ring 1.

In view of the danger of the cover falling off, the ring body 25 could be provided at the inner peripheral surface region of the cylindrical portion 21 of the cover 11. This would make it difficult for the cover to fall off the outer ring even when thermal shock from heating and cooling occurs. Moreover, merely providing the ring body 25 at the inner peripheral surface area of the cylindrical portion 21, depending on the type of resin, results in insufficient adaptation to temperature changes. In this case, there is the danger that the cylindrical portion 21 will deform, reducing the contact area with the inner peripheral surface of the outer ring 1 and degrading pullout force.

In view of the potential for deformation, in this embodiment, the ring body 25 extends from the inner diameter side area S1 of the cylindrical portion 21 to the inner diameter side area S2 of the flange portion 22. Accordingly, the starting point for bending of the cylindrical portion 21 is separated from the outer ring 1 (which is a heat source), and the amount of metal at the portion where bending occurs is increased. As a result, so the resin bending amount is suppressed.

Therefore, even when a thermal shock occurs as in temperature increase and decrease of the outer ring 1, because of the metal, bending of the cylindrical portion 21 is kept to a minimum. Moreover, the necessary contact area between the outer peripheral surface of the cylindrical portion 21 and the inner peripheral surface of the outer ring 1 is secured. Therefore the required pullout force is secured, thereby effectively preventing the cover 11 from falling off the outer ring 1.

The above structure provides the following benefit. For example, a knurled groove or other groove may form at the inner peripheral surface of the vehicle inward side edge section of the outer ring 1. The groove may engage the outer peripheral surface of the cylindrical portion 21. However, if the cover 11 is incorporated in the outer ring 1, part of the cylindrical portion 21 resiliently enters the grooved portion. As a result, the cover 11 is effectively prevented from being pulled out of the outer ring 1.

An opening may be provided for fitting a rotation detection device on the cover 11, and the rotation detection device may be fitted in the opening. This rotation detection device detects the rotational speed or the like of the wheel in order to control a vehicle anti-lock brake system (ABS) or a traction control system (TCS). It is advantageous to use the cover 11 as a cover equipped with such a rotation detection device. This is because the cover 11 is unlikely to fall off the outer ring 1 even when a thermal shock such as heating and cooling occurs.

Figure 5:
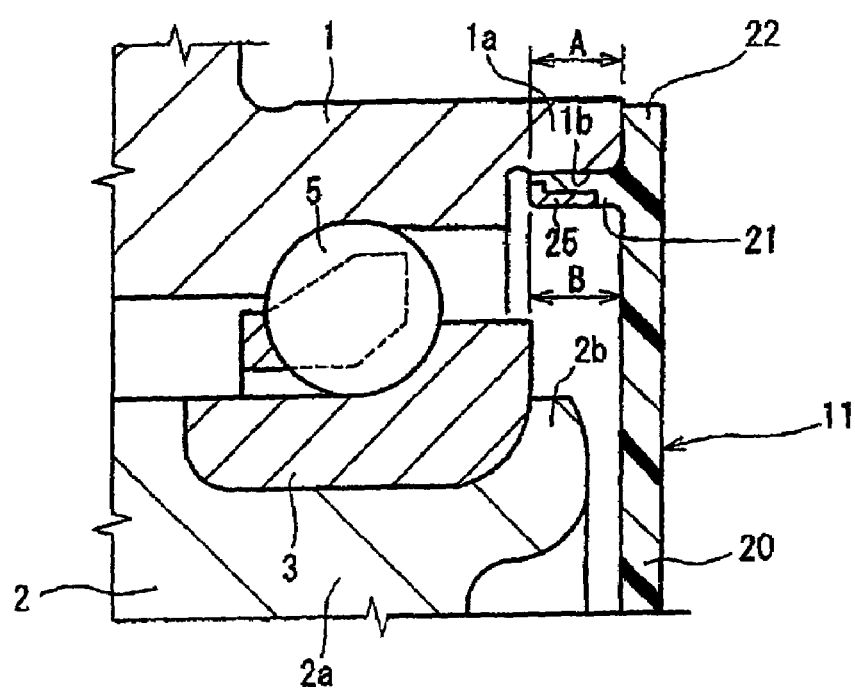
FIG. 5 is a cross-sectional view of a principal portion of a rolling bearing unit according to still another configuration of the present invention.
Figure 6:
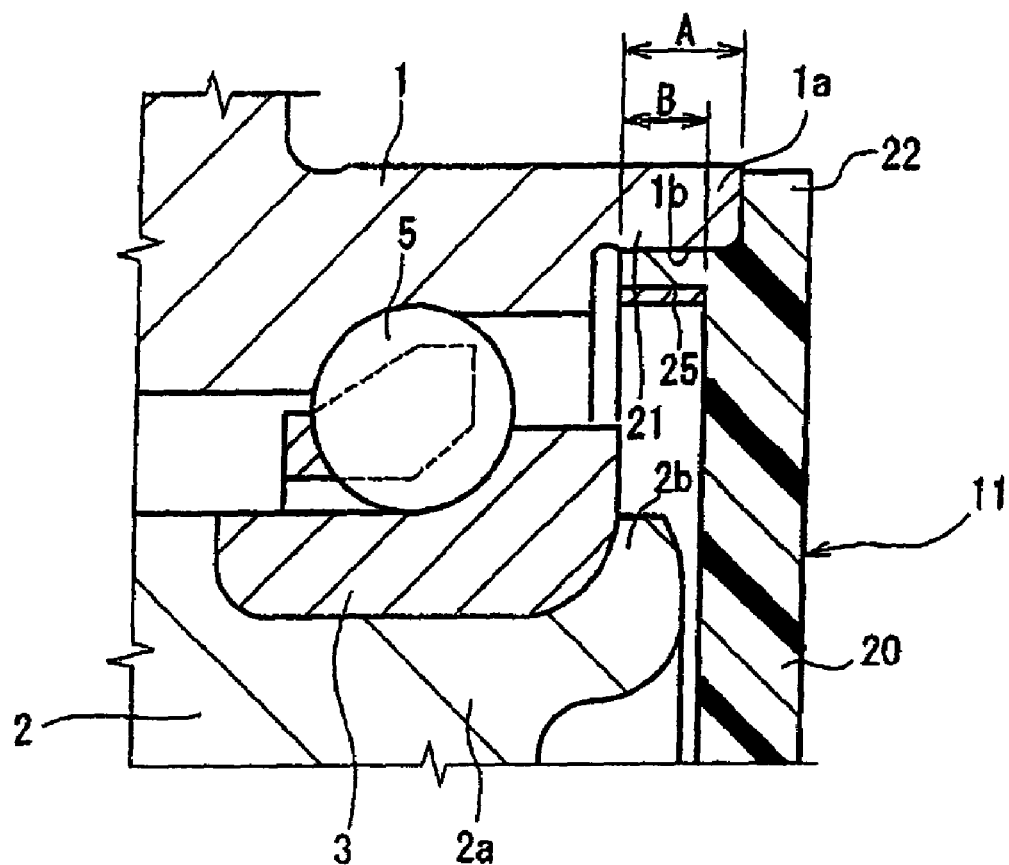
FIG. 6 is a cross-sectional view of a principal portion of a rolling bearing unit according to still another configuration of the present invention.

As shown in FIG. 5, the axial length B of the inner peripheral surface of the cylindrical portion 21 of the cover 11 is set approximately the same as the axial length A of the outer peripheral surface. Alternatively, as shown in FIG. 6, the axial length B of the inner peripheral surface of the cylindrical portion 21 of the cover 11 is set shorter than the axial length A of the outer peripheral surface. In either case, the ring body 25 can be disposed with respect to the cylindrical portion 21 in a manner similar to that of FIG. 2 or FIG. 3. In both configurations, screwing a nut in the hub spindle 2 prevents pullout of the inner ring 3 from the hub spindle 2.

The present invention is applicable to a rolling bearing unit for rotatably supporting wheels of an automobile or the like on a suspension system.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. A rolling bearing unit comprising:
an outer ring including an edge section opening, said opening including an inner peripheral surface;
a cover connecting to said opening;
said cover comprising:
  a circular plate portion covering said opening; and
  a cylindrical portion joined to said circular plate and including an cylinder inner peripheral surface and an opposing cylinder outer peripheral surface, said cylindrical portion being resin, said cylindrical portion fitting into and having said cylinder outer peripheral surface contacting said inner peripheral surface of said opening to retain said cover in said opening; and
  a ring body provided in contact with said cylinder inner peripheral surface of said cylindrical portion at a position opposing a portion of said cylinder outer peripheral surface contacting said inner peripheral surface of said opening, said ring body being metal and providing support to said cylindrical portion to effect press fitting of said cover to said opening.

2. The rolling bearing unit of claim 1, wherein said ring body is axially shorter than said cylinder inner peripheral surface of said cylindrical portion.

3. The rolling bearing unit of claim 1, wherein said ring body and said cylindrical portion of said cover each includes an end face, and said end faces are coplanar.

4. The rolling bearing unit of claim 1, wherein said ring body is integrated with said cylindrical portion by insert forming.

5. The rolling bearing unit according to claim 4, wherein said ring body includes an end face, and said end face is disposed radially outward.

6. A rolling bearing unit comprising:
an outer ring including an axial inward side, said axial inward side of said outer ring including an edge section opening, said opening including an inner peripheral surface;
a cover connecting to said opening; and
said cover comprising:
  a circular plate portion covering said opening;
  a cylindrical portion press fitting into said inner peripheral surface of said opening, said cylindrical portion having a periphery and a cylinder inner peripheral surface and an opposing cylinder outer peripheral surface in press fit contact with said opening, said cylindrical portion being resin;
  a flange portion provided at said periphery of said cylindrical portion, said flange portion defining a depth by which said cylindrical portion extends into said outer ring opening; and
  a metal ring body provided on and in contact with said cylinder inner peripheral surface of said cylindrical portion at a position opposing a portion of said cylinder outer peripheral surface contacting said inner peripheral surface of said opening and providing support to said cylindrical portion to effect press fitting of said cover to said opening.

7. The rolling bearing unit according to claim 6, wherein:
said cylinder inner peripheral surface of said cylindrical portion is axially longer than said cylinder outer peripheral surface thereof;
said ring body and said cylindrical portion each include an end face, said end faces being coplanar; and
said cylindrical outer peripheral surface is axially longer than said ring.

8. The rolling bearing unit of claim 7, wherein:
said outer ring, said ring body and said cylindrical portion each have coefficients of linear expansion; and
said coefficients of linear expansion for both said outer ring and said ring body are greater than said coefficient of liner expansion of said cylindrical portion.

9. The rolling bearing unit according to claim 7, wherein said cover is a resin, and said cover has a coefficient of linear expansion essentially equal to said coefficient of linear expansion of said outer ring.

10. A rolling bearing unit comprising:
an outer ring including outer and inner peripheral surfaces, said outer ring including axially outward and axially inward edges, said outer peripheral surface comprising a flange portion and said inner peripheral surface comprising first and second outer ring raceways;

a hub spindle including an axial outward side and an axial inward side, each respectively having an axial outward edge and an axial inward edge;

said axial outward side of said hub spindle including an outer peripheral surface, said outer peripheral surface of said hub spindle including a flange portion;

said hub spindle having an inner ring raceway opposing said first outer ring raceway, both said inner ring raceway of said spindle and said first outer ring raceway being disposed axially between said axial inner edge of said outer ring and said flange of said hub spindle; and said hub spindle including a small diameter cylindrical portion disposed axially between said axial inner edge of said hub spindle and said inner ring raceway of said hub spindle;

said bearing unit further comprising an inner ring disposed against said small diameter cylindrical portion of said hub spindle, said inner ring including an outer peripheral surface, said outer peripheral surface of said inner ring comprising an inner ring raceway, said inner ring raceway opposing said second outer ring raceway of said outer ring;

a plurality of rolling members disposed between said respective outer ring and inner ring raceways;

a seal disposed between first and second surfaces, said first surface being defined by said inner peripheral surface of said outer ring, adjacent to said axially outward edge of said outer ring, and said second surface being defined by said outer peripheral surface of said hub spindle; and said axially inward edge of said outer ring defining an inward edge of an opening, said opening including an inner peripheral surface;

said unit further comprising a cover connecting to said opening, said cover being resin;

said cover comprising:

a circular plate portion for covering said opening;

a cylindrical portion joined to said circular plate and including a cylinder inner peripheral surface and an opposing cylinder outer peripheral surface press fitting to said inner peripheral surface of said opening; and a flange portion disposed on said cylinder outer peripheral surface of said cylindrical portion, said flange portion defining a depth by which said cylindrical portion extends into said opening of said outer ring; and a ring body provided on and in contact with said cylinder inner peripheral surface of said cylindrical portion at a position opposing a portion of said cylinder outer peripheral surface contacting said inner peripheral surface of said opening, said ring body being provided on said cylinder inner peripheral surface by insert forming, said ring body being metal.

11. The rolling bearing unit according to claim 10, wherein:

said ring body and said cylindrical portion of said cover each include an axially outward side end face, and said axially outward side end faces are coplanar; and said cylinder outer peripheral surface of said cylindrical portion is axially longer than said ring body.

12. The rolling bearing unit of claim 10, wherein said ring body end face is disposed radially outward.

13. The rolling bearing unit of claim 10, wherein:

said flange portion of said cover includes an inner peripheral surface, and said inner peripheral surface axially extends inward of said inner peripheral surface of said cylindrical portion; and said ring body extends along said inner peripheral surfaces of both said cylindrical portion of said cover and said flange portion of said cover.

* * * * *